Aug. 29, 1961     L. J. NOVAK     2,998,139
APPARATUS FOR HEAT TREATMENT OF SEPTIC
TANK LIQUID EFFLUENT
Filed Sept. 16, 1957
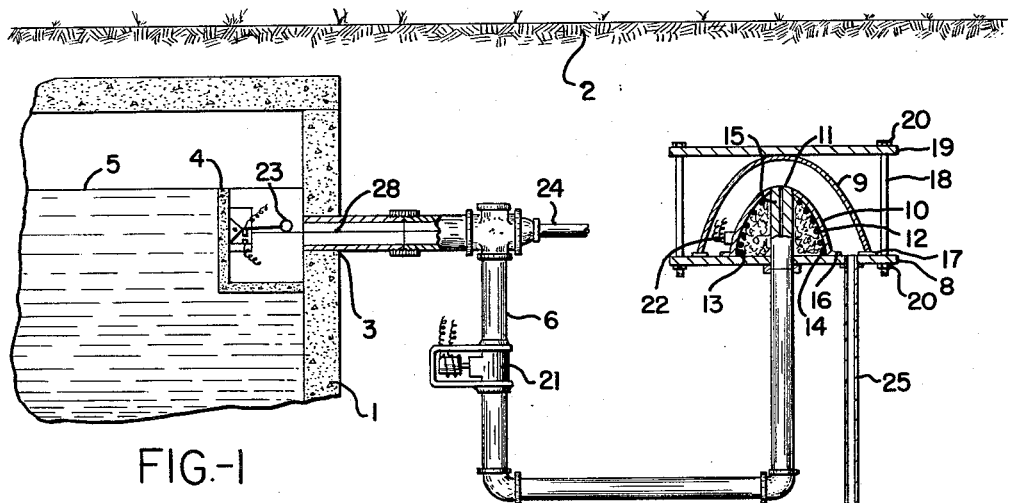
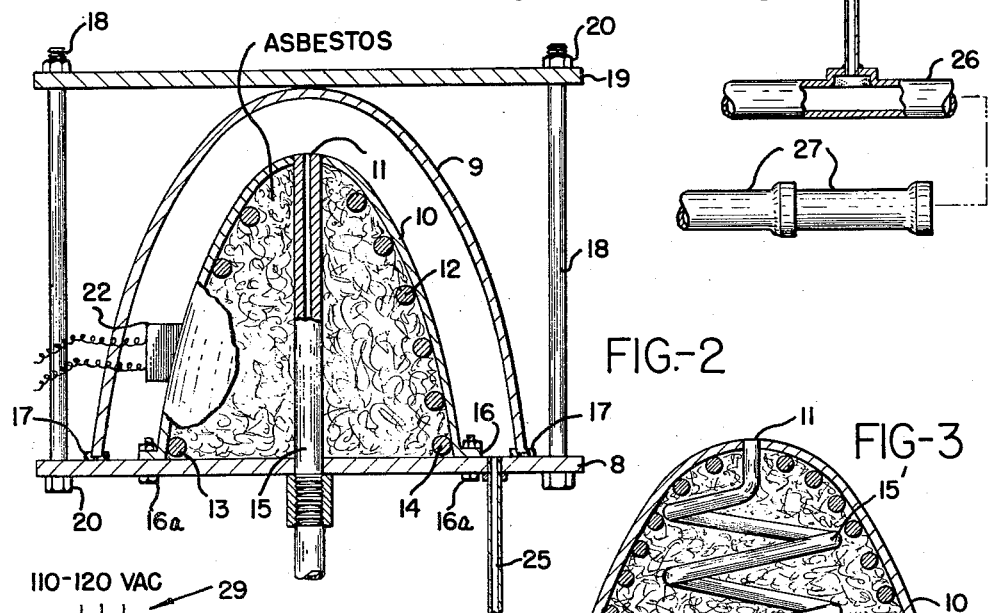
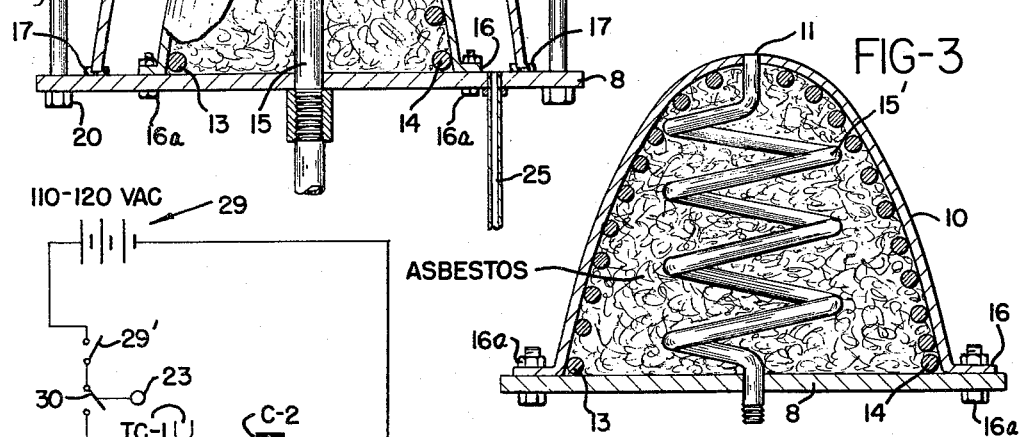
INVENTOR.
LEO J. NOVAK
BY Toulmin & Toulmin
ATTORNEYS

United States Patent Office 2,998,139
Patented Aug. 29, 1961

2,998,139
APPARATUS FOR HEAT TREATMENT OF SEPTIC TANK LIQUID EFFLUENT
Leo J. Novak, Dayton, Ohio, assignor to The Commonwealth Engineering Company of Ohio, Dayton, Ohio, a corporation of Ohio
Filed Sept. 16, 1957, Ser. No. 684,097
3 Claims. (Cl. 210—97)

This invention relates to sewage disposal, and more particularly an apparatus for the treatment of septic tank effluent prior to the receipt of the effluent in a drain field.

Presently in many geographical areas of the United States the disposal of sewage through the medium of septic tanks is becoming limited. This is because the high water level in many areas inhibits quick drain-off of effluent from the tile associated with the septic tank and putrefaction tends to result. Such condition occasions unhealthy, ill-smelling and unsanitary situations.

A primary purpose of the present invention is to increase the digestibility of septic tank effluent and to provide increasing amounts of acceptable non-foul smelling, sanitary, soluble components in the effluent passing to the tile, the effluent having a lowered Biochemical Oxygen Demand (B.O.D.).

Putrefaction generally involves the anaerobic decomposition of nitrogenous organic matter; and particularly decomposition by anaerobic processes of proteins by the agency of bacteria and fungi which results in the formation of foul-smelling incompletely oxidized products such as mercaptans, hydrogen sulfide, and so forth.

It is therefore desirable to have sufficient oxygen within the effluent passing to the tile of the septic tank system to maintain aerobic conditions within the effluent.

The B.O.D. factor is the amount of oxygen required to maintain the aerobic condition during decomposition, thus inhibiting putrefaction which sets in when the aerobic conditions are not maintained.

It is a purpose of this invention to attain a clear septic tank effluent containing sewage solubles with a lowered B.O.D. which when standing or draining slowly from the tile will not become foul-smelling and a menace to health.

This is accomplished in the practice of the present invention by providing for the killing of the vegetative forms of most bacteria, including the putrefactive and pathogenic ones, including typhoid and dysentery.

The B.O.D. in the practice of the invention is reduced by heating a septic tank effluent to a temperature between about 90° C. and 100° C. but not to the boiling point of the effluent, which normally would be slightly above 100° C. because of the dissolved material therein. Maintaining the temperature below that at which the effluent boils is not only effective to avoid a foul-smelling result in the drain field, but is economical both in power consumption and in the working life of a septic tank effluent system. In effect the treatment of the present invention is a form of pasteurization of the septic tank effluent.

Accordingly it is a principal object of the present invention to provide apparatus for the treatment of septic tank effluent as the effluent emerges from the septic tank and before it passes over the tile to the drain field.

Other objects of the invention include the elimination of noxious odors in the area of drain fields of septic tanks; conservation of area by permitting the utilization of septic tank systems which require smaller drain fields; reduction of sanitation problems customarily associated with septic tanks.

These and other objects of the invention will become more apparent from the following detailed description and accompanying drawings wherein:

FIGURE 1 is a schematic view in side elevation of the septic tank effluent treatment apparatus of this invention;

FIGURE 2 is an enlarged view of a portion of apparatus useful in the arrangement of FIGURE 1;

FIGURE 3 is an enlarged view illustrating a modified arrangement of a portion of the apparatus of FIGURE 2; and FIGURE 4 is a schematic diagram of an electrical circuit arrangement useful in conjunction with the invention.

Referring now to the drawings, and more particularly to FIGURE 1, like reference numerals indicate the same part throughout the various views.

The numeral 1 designates a conventional type of septic tank of concrete or like material located in the ground which is designated 2. The septic tank has an outlet opening 3 which is protected by a baffle 4 effective to prevent solids from passing out the opening 3, the septic tank level being indicated at 5.

In this connection in the conventional septic tank some of the solid waste materials which are discharged into the tank customarily float upon the surface of the water in the tank while they are being exposed to bacterial action. Subsequently this solid material falls to the bottom of the tank where it accumulates until the tank is cleaned. The water level within the tank indicated at 5 corresponds to the upper surface of the baffle 4, which function is to provide a constant maximum level within the septic tank.

A conduit 6 communicates the opening 3 with a pasteurizing device generally indicated at 7. The pasteurizing device includes a solid base 8 of stainless steel upon which there is mounted in air tight relation a housing 9 which is suitably of metal. Within the housing 9 and on the plate 8 there is mounted a dome or dome-like structure 10 also of metal, preferably stainless steel, and having a small outlet opening at 11.

The numeral 12 designates a heating element which may comprise, for example, a heating coil of 15 mil tungsten wire strung with ceramic bead insulators and supported on insulating material such as asbestos and mounted adjacent to the inner wall of the steel dome 10. Leads 13, 14 extend from the heating coil 12 for connection to a source of power.

Interiorly of the dome 10 a pipe 15 of steel is welded to the dome at its upper end and is in communication with the opening 11, which opening may suitably be about 1/16 of an inch in diameter. The pipe 15 passes through the base 8 of the pasteurizing device and is coupled to the conduit 6.

As shown most clearly in FIGURE 2 a rim 16 integral with or welded to the dome 10 is secured to the plate 8 by bolts as at 16a. The housing 9 rests on a rubber gasket 17 and is compressed against the gasket by tension in rods 18 drawn tight between plates 8 and 19 by nuts 20 threaded on the rods against the plates as shown. Accordingly the interior of the housing 9 is accessible for cleaning.

The opening 11 (FIGURE 1) is positioned at about the same level as the bottom of the opening 3 or slightly below in order to provide for gravity flow from the opening 3 through the opening 11. The effluent moving through the opening 11 discharges over the outer or heat-transfer surface of the dome in a thin film and is rapidly heated to the desired temperature of between 90 and 100° C., which temperature is preselected. Control of the temperature is attained through the thermocouple indicated generally at 22 (FIGURE 1).

Referring now again to the conduit 6, the same includes a valve 21 which is normally closed, the opening of which is controlled by the thermostatic element 22 mounted on the dome 10 (FIGURE 1). Suitably positioned within the conduit 6 is a liquid level responsive element 23 which is so connected (FIGURE 4) electrically as to provide for the supplying of the electrical energy to the coil 12, when the level of the effluent about the opening 3 attains a predetermined height.

Also associated with the conduit 6 is an overflow 24 to provide against backing up of the liquid of the septic tank should the system fail in any particular. An outlet designated at 25 extends from the pasteurizing device to the tile 26 for the flow of treated effluent to the drain field 27 over the tile.

In the practice of the invention septic tank effluent passes over the baffle 4 and is retained by the valve 21 until the head of effluent builds up over the level device 23 to about the point designated by the dotted line as at the numeral 28. At this time the level device is actuated to provide electrical power from the source 29 (FIGURE 4) to the heating coil 12. The heating coil raises the temperature of the dome 10 and when the dome 10 has reached the predetermined heat value the thermostatic element 22 provides for application of power to the solenoid valve coil at 21a (FIGURE 4) to open the valve. The head of liquid above the valve then forces any liquid in pipe 15 and lower portion of the conduit 6 outwardly through the opening 11 and in a thin film down over the outside of the dome 10. The effluent is heated rapidly, some vapor being created in the space between the dome 10 and the housing 9. A small size of opening 11 contributes to somewhat restricted flow and to a shallow depth in the form of a thin film of the effluent in the dome. Such aids rapids heating. However, the effluent when heated without boiling is freed of putrefractive and pathogenic bacteria in the vegetative form and the B.O.D. of the effluent emanating from the outlet 25 is materially reduced.

As the effluent passes on to the tile at 26 it tends to be aerated by contact with the surrounding earth, which is of further assistance in reducing the putrefractive tendencies.

When a discharge of effluent has been completed from the tank 1 over the baffle 4 and the level above the valve 21 has been reduced sufficiently to lower the liquid level device at 23, illustrated in the form of the usual ball, heat is no longer supplied to the coil 12 and the temperature of the dome drops, causing the thermostatic element at 22 to close the valve 21.

This procedure is repeated whenever the head of effluent builds up to about the level 28, whereupon the above sequence of operation takes place, thus assuring that all effluent passing through the device is subjected to the pasteurizing treatment.

A suitable circuit for effecting the automatic operation is set out in FIGURE 4. Therein the manually operable main switch 29' connected to the source 29 and positioned above ground for convenience is shown in electrical series with the liquid level device represented at 23 and having a switch arm 30 closable when the liquid level rises to 28 (FIGURE 1).

Current is applied to heater coil 12 through normally closed relay arm R-2 when 29' and 30 are closed. A temperature-controlled relay TC-1 forming a component of the thermostatic element 22 closes when dome 10 reaches temperature, energizing its associated coil C-1, which coil closes normally open relay arm R-1, thus energizing the valve coil 21a to open the valve.

Normally open thermocouple actuated switch TC-2 usually controls the application of heat to coil 12 for TC-2 is arranged to close when the temperature tends to exceed 100° C., thus energizing coil C-2; this opens normally closed relay arm R-2, shutting off current to heater coil 12 until the temperature again falls below its predetermined value of normally about 100° C.—low enough to inhibit boiling of the effluent.

When the liquid level drops at 28 power to all components is shut off and they return to their normal condition shown in FIGURE 4.

As shown in FIGURE 3, the pipe 15' may be in the form of a coil to provide for pre-heating of the effluent as it passes from the conduit 6 to the opening 11. Further, the treated effluent, since it is at a relatively high temperature of 90 to 100° C., may be directed over the conduit 6 to preheat the effluent passing to the coil 15', to thus further reduce the amount of heat input required, and effecting economy.

The apparatus and method described result in an economical procedure for treatment of septic tank effluent and which is suitable for use by the average home owner in this country.

It will be understood that this invention is susceptible to modification in order to adapt it to different usages and conditions and accordingly, it is desired to comprehend such modifications within this invention as may fall within the scope of the appended claims.

I claim:

1. In combination in a disposal system, a septic tank having an outlet, a pasteurizing device having a housing and a dome beneath the housing, said dome including a heat transfer surface on the exterior thereof and having an opening in the upper end of the dome communicating the dome exterior with the interior, a conduit communicating said opening through the interior of the dome with the outlet of the septic tank, an outlet from the heat transfer surface within the pasteurizing device to a disposal field, first means to heat said surface, other means responsive to the level of effluent of the tank to control said first means whereby said first means is actuated upon a build-up of effluent to a predetermined level and inactivated by a drop of effluent level below the predetermined level, and means responsive to the temperature of effluent passing over the said heat transfer surface to limit the actuation of said first means and the temperature of said effluent.

2. In combination in a disposal system, a septic tank having an outlet, a pasteurizing device having a housing and a dome beneath the housing, said dome including a heat transfer surface on the exterior thereof and having an opening in the upper end of the dome, a conduit communicating said opening through the interior of the dome with the outlet of the septic tank, said opening being on such a level with respect to the septic tank that gravity flow of septic tank effluent will take place through the opening from the septic tank outlet, a solenoid valve in the conduit arranged to normally prevent the flow of septic tank effluent to the opening of the dome, means to provide heat to said heat transfer surface of the dome, a thermostatic element on the dome cooperatively arranged with the solenoid valve to open said valve in response to a temperature condition on said heat transfer surface, a power source, a heating element associated with said heat transfer surface, a liquid level device in the conduit operable to connect said power source with said heating element upon rise of liquid level in the conduit, and an outlet from the heat transfer surface within the pasteurizing device to a disposal field.

3. In combination in a disposal system, a septic tank having an outlet, a pasteurizing device having a housing and a dome beneath the housing, said dome including a heat transfer surface on the exterior thereof and having an opening in the upper end of the dome, a conduit communicating said opening through the interior of the dome with the outlet of the septic tank, said opening being on such a level with respect to the septic tank that gravity flow of septic tank effluent will take place through the opening from the septic tank outlet, a solenoid valve in the conduit arranged to normally prevent the flow of septic tank effluent to the opening of the dome, means to provide heat to said heat transfer surface of the dome, a thermostatic element on the dome cooperatively arranged with the solenoid valve to open said valve is response to a temperature condition on said heat transfer surface, a power source, a heating element associated with said heat transfer surface, a liquid level device in the conduit operable to connect said power source with said heating element upon rise of liquid level in the conduit, an outlet from the heat transfer surface within the pasteurizing device to a disposal field, and an overflow in the conduit between said valve and said liquid level device.

References Cited in the file of this patent

UNITED STATES PATENTS

| | | |
|---|---|---|
| 1,158,586 | Thornton | Nov. 2, 1915 |
| 1,195,615 | Simon | Aug. 22, 1916 |
| 1,198,073 | Simon | Sept. 12, 1916 |
| 1,318,237 | Sordi | Oct. 7, 1919 |
| 1,325,559 | Eckelmann | Dec. 23, 1919 |
| 1,633,079 | Engle | June 21, 1927 |
| 1,633,080 | Engle | June 21, 1927 |
| 1,695,227 | Bolinger | Dec. 11, 1928 |
| 2,115,601 | Whitby et al. | Apr. 26, 1938 |
| 2,369,526 | Brandl | Feb. 13, 1945 |
| 2,432,887 | Haviland | Dec. 16, 1947 |

FOREIGN PATENTS

| | | |
|---|---|---|
| 13,758 | Great Britain | 1891 |
| 29,217 | Great Britain | 1904 |

OTHER REFERENCES

"American Sewerage Practice," Metcalf et al., vol. III, Disposal of Sewage, Third edition, 1935, McGraw-Hill, New York, pages 794–798 relied on.